US011772313B2

(12) United States Patent
Xie et al.

(10) Patent No.: US 11,772,313 B2
(45) Date of Patent: Oct. 3, 2023

(54) INJECTION MOLDING ADAPTIVE COMPENSATION METHOD BASED ON MELT VISCOSITY FLUCTUATION

(71) Applicant: HAITIAN PLASTICS MACHINERY GROUP CO., LTD, Ningbo (CN)

(72) Inventors: Pengcheng Xie, Ningbo (CN); Nanhong Fu, Ningbo (CN); Jinling Wang, Ningbo (CN); Yuxuan Xu, Ningbo (CN); Xiaolong Jiao, Ningbo (CN); Kaifang Dang, Ningbo (CN); Wei Wu, Ningbo (CN); Zhifeng Ying, Ningbo (CN); Minwen Xia, Ningbo (CN)

(73) Assignee: HAITIAN PLASTICS MACHINERY GROUP CO., LTD, Ningbo (CN)

( * ) Notice: Subject to any disclaimer, the term of this patent is extended or adjusted under 35 U.S.C. 154(b) by 289 days.

(21) Appl. No.: 17/309,008

(22) PCT Filed: Jun. 30, 2020

(86) PCT No.: PCT/CN2020/099115
§ 371 (c)(1),
(2) Date: Apr. 12, 2021

(87) PCT Pub. No.: WO2021/243779
PCT Pub. Date: Dec. 9, 2021

(65) Prior Publication Data
US 2022/0024099 A1    Jan. 27, 2022

(30) Foreign Application Priority Data

Jun. 1, 2020   (CN) .......................... 202010485142.7

(51) Int. Cl.
*B29C 45/77*   (2006.01)
*B29C 45/78*   (2006.01)
*B29K 25/00*   (2006.01)

(52) U.S. Cl.
CPC .............. *B29C 45/77* (2013.01); *B29C 45/78* (2013.01); *B29C 2945/7604* (2013.01);
(Continued)

(58) Field of Classification Search
CPC .................... B29C 45/77; B29C 45/78; B29C 2945/76006; B29C 2945/7604;
(Continued)

(56) References Cited

U.S. PATENT DOCUMENTS 7,008,574 B2    3/2006 Matsubayashi et al.
2016/0250791 A1*  9/2016 Schiffers ............. B29C 45/7646
                                                        264/40.4

FOREIGN PATENT DOCUMENTS

CN    101890792 A    11/2010
CN    102490329 A    6/2012
(Continued)

OTHER PUBLICATIONS

International Search Report dated Mar. 2, 2021 from PCT Application No. PCT/CN2020/099115.
(Continued)

*Primary Examiner* — Alison L Hindenlang
*Assistant Examiner* — Olukorede Esan
(74) *Attorney, Agent, or Firm* — INNOVATION CAPITAL LAW GROUP, LLP; Vic Lin

(57) ABSTRACT

An injection molding adaptive compensation method based on melt viscosity fluctuation comprising: initializing equipment; in a pre-calculation stage, introducing melt into a mold cavity at a constant rate, collecting pre-calculation parameters in each sampling period T, and obtaining a first
(Continued)

injection work in the pre-calculation stage by using a first calculation formula; in a self-adaptation stage, introducing the melt into the mold cavity at a constant rate, collecting adaptive parameters in each sampling period T, and obtaining a second injection work in the self-adaptation stage by using a second calculation formula; calling the PVT characteristics of current processing raw materials to construct a PVT relation function, and obtaining an optimized V/P switching point by using a PVT weight control model; and according to the injection work at the pre-calculation stage and the injection work at the present stage, obtaining an optimized holding pressure according to an injection work adjustment model.

6 Claims, 2 Drawing Sheets

(52) U.S. Cl.
CPC ............ *B29C 2945/76006* (2013.01); *B29C 2945/76287* (2013.01); *B29C 2945/76498* (2013.01); *B29C 2945/76765* (2013.01); *B29C 2945/76936* (2013.01); *B29K 2025/06* (2013.01)

(58) Field of Classification Search
CPC ........... B29C 2945/76287; B29C 2945/76498; B29C 2945/76765; B29C 2945/76936; B29C 2045/773; B29C 2045/776; B29C 2945/76882; B29K 2025/06
See application file for complete search history.

(56) References Cited

FOREIGN PATENT DOCUMENTS

| | | |
|---|---|---|
| CN | 102642286 A | 8/2012 |
| CN | 104626494 A | 5/2015 |
| CN | 108656488 A | 10/2018 |
| JP | H03153332 A | 7/1991 |

OTHER PUBLICATIONS

Zhou Xundao, Process dynamic compensation and product consistency control in plastic injection molding, China Doctoral Dissertation Full-text Database, 2018, p. 44-52, Wuhan, China.

* cited by examiner

INJECTION MOLDING ADAPTIVE COMPENSATION METHOD BASED ON MELT VISCOSITY FLUCTUATION

TECHNICAL FIELD

The invention relates to the field of injection molding control, in particular to an injection molding adaptive compensation method based on melt viscosity fluctuation.

DESCRIPTION OF RELATED ART

Among all the stages of an injection molding process, only in an injection stage and a pressure holding stage, melt enters a mold cavity from a charging barrel. In the injection stage, a screw moves at a constant speed, and the melt is introduced into the mold cavity by the screw at a constant rate until a dividing point of two stages of screw movement (V/P switching point). In the pressure holding stage, the screw moves under a constant pressure, and the residual melt is introduced into the mold cavity by the screw at a constant pressure, that is, holding pressure, to supplement the shrinkage of a product, and finally the product is processed.

In a conventional production and processing state, the viscosity of processed melt is easily interfered by the external environment, such as the change in the water content of raw materials, the change in the batch of raw materials and even the change in the proportion of recycled materials contained in raw materials. The change in viscosity will lead to the change in injection process parameters, thus affecting the quality of melt entering the mold cavity in each processing cycle. However, in the traditional injection molding process, the process parameters, such as V/P switching point and pressure holding point, which can determine the weight of melt entering the cavity, will not change along with the change of melt viscosity, which eventually causes the weight fluctuation of molded products.

In the prior art, for example, U.S. Pat. No. 7,008,574 discloses an electric injection molding machine, an electric injection mechanism for injecting molding materials into a mold by the driving force of a motor, an injection control unit and a servo driver for controlling an injection motor to follow an injection speed datum, and a reference compensation unit for compensating an injection speed reference according to the characteristics of a hydraulic driving system, so that the fluctuation characteristics of injection speed relative to injection pressure are close to those of injection speed relative to injection speed when the electric injection mechanism is controlled. The quality of injection molding is ensured by controlling the fluctuation characteristics of injection. Chinese Pat. No. CN101890792B, for example, discloses a control method for improving injection molding or extrusion molding machinery, in which when a current value of a melt quality parameter deviates from a set value to a predetermined range, a set value of at least one process operation parameter will be automatically adjusted to control an energy value transferred to plastic melt from a heating source and a mechanical driving source, and optimize system energy consumption and melt quality by automatically adjusting the set values of process parameters. The quality of injection molding is controlled by comparing the current value of melt quality with the predetermined range.

BRIEF SUMMARY OF THE INVENTION

In order to solve the above problems, ensure that the melt viscosity change caused by the change in the water content of raw materials, the change in the batch of raw materials and the change in the proportion of recycled materials contained in raw materials is taken into account during injection molding of an injection molding machine, ensure the stability of quality fluctuation of molded products, and improve the repetition accuracy and yield of molded products, the invention provides an injection molding adaptive compensation method based on melt viscosity fluctuation, which comprises the following steps:

S1, initializing equipment, and setting an initial V/P switching point, an initial holding pressure and an initial barrel temperature;

S2, entering a pre-calculation stage, introducing melt into a mold cavity at a constant rate, and collecting pre-calculation parameters in each sampling period T, including injection pressure, screw displacement and melt temperature;

S3, according to the pre-calculation parameters, obtaining a first injection work in the pre-calculation stage by using a first calculation formula;

S4, entering a self-adaptation stage, introducing the melt into the mold cavity at a constant rate, and collecting adaptive parameters in each sampling period T, including injection pressure, screw displacement and melt temperature;

S5, according to the adaptive parameters, obtaining a second injection work in the self-adaptation stage by using a second calculation formula;

S6, calling the PVT characteristics of current processing raw materials to construct a PVT relation function, and obtaining an optimized V/P switching point by using a PVT weight control model; and S7, according to the injection work at the pre-calculation stage and the injection work at the present stage, obtaining an optimized holding pressure according to an injection work adjustment model.

Further, before S1, S0 is also included: establishing a PVT characteristic library according to raw material types.

Further, in S2, pre-calculated parameters of a preset number of sampling periods T are collected.

Further, the sampling periods T of the pre-calculation stage and the self-adaptation stage are consistent.

Further, in S3, the first calculation formula is:

$$W_0 = \left| K * \int_{X_{start}}^{X_{switch}} p\,dx \right| = \left| K * \sum \frac{P_i + P_{i-1}}{2} (x_i - x_{i-1}) \right|; \quad (1)$$

where $W_0$ is the first injection work; a pressure value at a starting point of the pre-calculation stage is set to be $P_{start}$, and a screw displacement value is set to be $X_{start}$; a pressure at an end point of the pre-calculation stage is set to be $P_{switch}$, and a screw displacement value is set to be $X_{switch}$; and $p_i$ and $x_i$ respectively represent the injection pressure and screw displacement in an $i^{th}$ sampling period T, and K is a material correction coefficient related to the material itself.

Further, in S5, the second calculation formula is:

$$W_t = \left| K * \int_{X_{start}}^{X^*_{switch}} p\,dx \right| = \left| K * \sum \frac{P_j + P_{j-1}}{2} (x_j - x_{j-1}) \right|; \quad (2)$$

where $W_t$ is the second injection work; a pressure value at a starting point of the self-adaptation stage is set to be $P_{start}$, a screw displacement value is set to be $X_{start}$, and the displacement value is consistent with $X_{start}$ in the pre-calculation stage; a pressure value at an end point of the self-adaptation stage is set to be $P^*_{switch}$, and a screw displacement value is set to be $X^*_{switch}$; and $p_j$ and $x_j$ respectively represent the injection pressure and screw displacement in a $j^{th}$ sampling period T, and K is a material correction coefficient related to the material itself.

Further, in S6, the PVT weight control model is:

$$x_t = \frac{x_0 * V(T_t, P_t)}{V(T_0, P_0)}; \quad (3)$$

where $x_t$ is an optimized V/P switching point position at the current stage, and $x_0$ is an initial V/P switching point position; V(T,P) is a PVT relation function of currently processed materials, $T_0$ and $T_t$ are melt temperature in the pre-calculation stage and the self-adaptation stage respectively, and $P_0$ and $P_t$ are the pressure values of characteristic points on injection pressure curves of the pre-calculation stage and the self-adaptation stage respectively; and the characteristic point is a point on a collected injection pressure curve which is separated from the V/P switching point by a safe distance $X_s$.

Further, in S7, the injection work adjustment model is:

$$P_{KL} = P_{K0} * K_0 * \frac{W_t}{W_0}; \quad (4)$$

where $P_{KL}$ is an optimized holding pressure value of each mold, $P_{K0}$ is an initial holding pressure, and $K_0$ is a correction coefficient related to a material product.

Further, after S3, the method further comprises:

S31, entering a pressure holding stage, and introducing the residual melt into the mold cavity under the initial holding pressure.

Further, after S7, the method further comprises:

S71, entering the pressure holding stage, and introducing the residual melt into the mold cavity under the optimized holding pressure; and S8: returning to S4 until the injection molding task is completed.

Compared with the prior art, the invention at least has the following beneficial effects:

(1) compared with the traditional idea, the injection molding adaptive compensation method based on melt viscosity fluctuation in the invention combines the PVT characteristic relationship and melt index measurement mechanism of polymer materials to adjust the V/P switching point and holding pressure in the injection molding process; and compared with an existing V/P switching point and holding pressure control method, the method of the invention can respond to the fluctuation of melt viscosity in the injection molding process, and make adjustment and optimization responding to the fluctuation, so as to improve the repetition accuracy and yield of molded products;

(2) there is no need to install a sensor on a mold, which reduces the requirements for the mold itself and improves the adaptability and universality to a certain extent; and (3) the intelligent degree of an injection molding machine is greatly improved, the self-learning process can be completed within only one production stage, and the V/P switching point and holding pressure can be adjusted adaptively from the second stage, and the adjustment can be completed automatically in the whole process without manual intervention.

DETAILED DESCRIPTION OF THE INVENTION

The following are specific embodiments of the invention and a further description of the technical scheme of the invention with reference to the drawings, but the invention is not limited to these embodiments.

Embodiment 1

Figure 1:
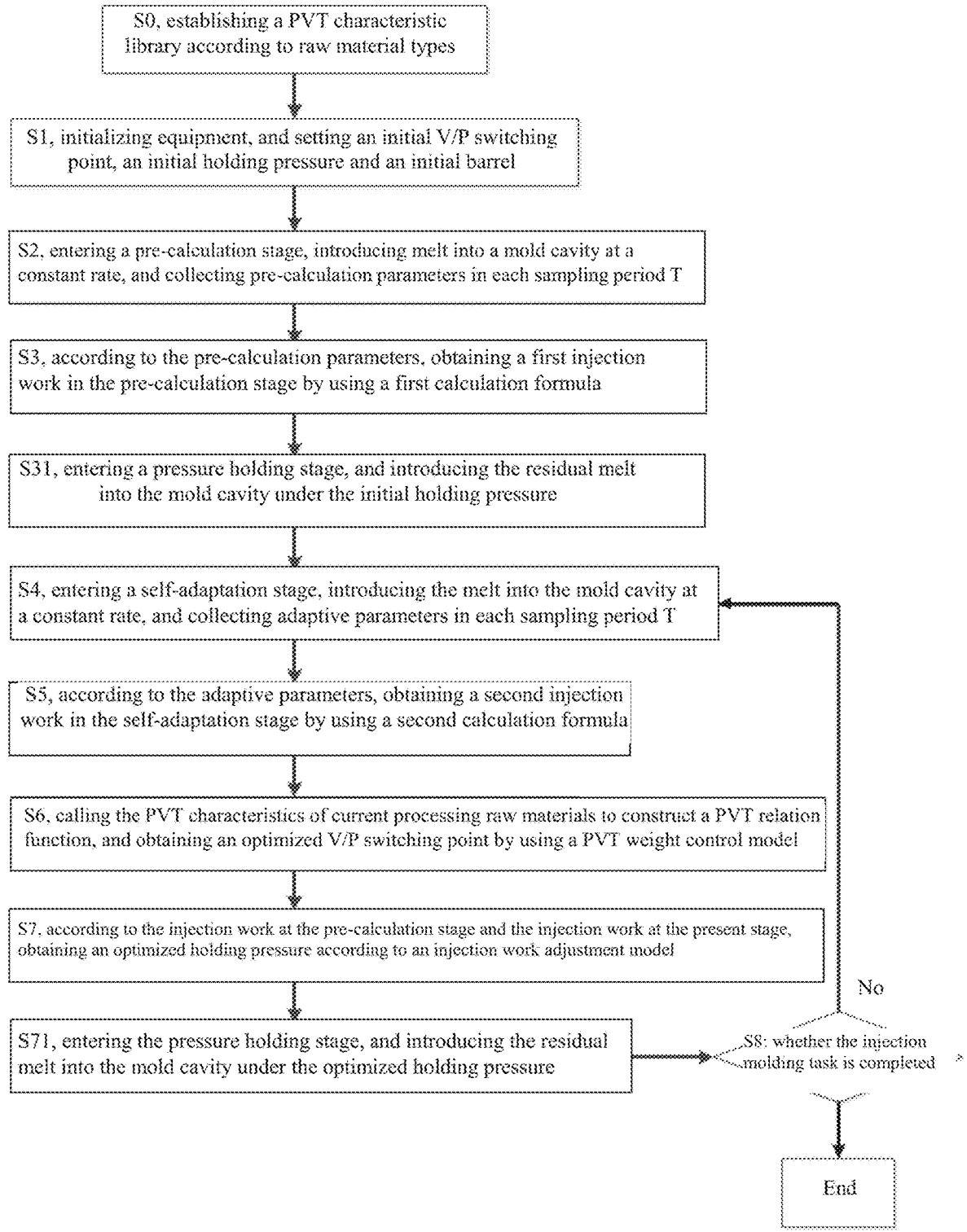
FIG. 1 is a flow chart of an injection molding adaptive compensation method based on melt viscosity fluctuation.

In order to solve the above problems, ensure that the melt viscosity change caused by the change in the water content of raw materials, the change in the batch of raw materials and the change in the proportion of recycled materials contained in raw materials (that is, the change in the PVT characteristics of polymer materials) is taken into account during injection molding of an injection molding machine, ensure the stability of quality fluctuation of molded products, and improve the repetition accuracy and yield of molded products, as shown in FIG. 1, the invention provides an injection molding adaptive compensation method based on melt viscosity fluctuation, which comprises the following steps:

S1, initializing equipment, and setting an initial V/P switching point, an initial holding pressure and an initial barrel temperature;

S2, entering a pre-calculation stage, introducing melt into a mold cavity at a constant rate, and collecting pre-calculation parameters in each sampling period T, including injection pressure, screw displacement and melt temperature;

S3, according to the pre-calculation parameters, obtaining a first injection work in the pre-calculation stage by using a first calculation formula;

S4, entering a self-adaptation stage, introducing the melt into the mold cavity at a constant rate, and collecting adaptive parameters in each sampling period T, including injection pressure, screw displacement and melt temperature;

S5, according to the adaptive parameters, obtaining a second injection work in the self-adaptation stage by using a second calculation formula;

S6, calling the PVT characteristics of current processing raw materials to construct a PVT relation function, and obtaining an optimized V/P switching point by using a PVT weight control model; and S7, according to the injection work at the pre-calculation stage and the injection work at the present stage, obtaining an optimized holding pressure according to an injection work adjustment model.

Before S1, S0 is also included: establishing a PVT characteristic library according to raw material types.

Further, in S2, pre-calculated parameters of a preset number of sampling periods T are collected, and the sampling periods T of the pre-calculation stage and the self-adaptation stage are consistent.

In the invention, S2-S3 are the data pre-calculation stage in the invention, in which collected pre-calculation parameters are sorted out, and an integral value of pressure versus displacement in this stage is obtained by the following first calculation formula, and is defined as injection work $W_0$ to characterize the melt viscosity in this stage:

$$W_0 = \left| K * \int_{Xstart}^{Xswitch} p\, dx \right| = \left| K * \sum \frac{p_i + p_{i-1}}{2}(x_i - x_{i-1}) \right|; \quad (1)$$

where $W_0$ is the first injection work; a pressure value at a starting point of the pre-calculation stage is set to be $P_{start}$, and a screw displacement value is set to be $X_{start}$; a pressure at an end point of the pre-calculation stage is set to be $P_{switch}$, and a screw displacement value is set to be $X_{switch}$; and K is a material correction coefficient related to the material itself. Starting from position $P_{start}$, the injection pressure and screw displacement of the i ($i=1\sim n$)$^{th}$ period are sampled every other fixed period T, and sampling points are recorded as $p_i$ and $x_i$ respectively.

Further, S3 also comprises:

S31, entering a pressure holding stage, and introducing the residual melt into the mold cavity under the initial holding pressure.

Steps S4-S7 are the self-adaption stage in the invention, in which collected self-adaption parameters are sorted out, and an integral value of pressure versus displacement in this stage is obtained by the following second calculation formula, and is defined as injection work $W_t$ to characterize the melt viscosity in this stage:

$$W_t = \left| K * \int_{Xstart}^{X^*_{switch}} p\, dx \right| = \left| K * \sum \frac{p_j + p_{j-1}}{2}(x_j - x_{j-1}) \right|; \quad (2)$$

where $W_t$ is the second injection work; a pressure value at a starting point of the self-adaptation stage is set to be $P_{start}$, a screw displacement value is set to be $X_{start}$, and the displacement value is consistent with $X_{start}$ in the pre-calculation stage; a pressure value at an end point of the self-adaptation stage is set to be $P^*_{switch}$, and a screw displacement value is set to be $X^*_{switch}$; and K is a material correction coefficient related to the material itself. Starting from position $P_{start}$, the injection pressure and screw displacement of the j ($j=1\sim n$)$^{th}$ period are sampled every other fixed period T, and sampling points are recorded as $p_j$ and $x_j$ respectively.

By comparing the first injection work and the second injection work, and based on the following injection work adjustment model, the optimized holding pressure value can be obtained through calculation:

$$P_{KL} = P_{K0} * K_0 * \frac{W_t}{W_0}; \quad (4)$$

where $P_{KL}$ is an optimized holding pressure value of each mold, $P_{K0}$ is an initial holding pressure, and $K_0$ is a correction coefficient related to a material product. Because pressure, specific volume and temperature are three very important parameters in the plastic molding process, which have great influence on the properties of materials in all aspects and also play a decisive role in the quality of final injection molded products, PVT characteristics are added to the control elements of injection molding in the invention. According to a two-domain Tait equation of the melt, the specific volume of polymer materials in a molten state can be expressed as:

$$V(T, P) = [b_1 + b_2(T - b_5)]\left\{1 - C\ln\left[1 + \frac{P}{b_3 \exp[-b_4(T - b_5)]}\right]\right\}; \quad (5)$$

where V(T,P) is the specific volume under temperature T and pressure P, C is a universal constant, and $b_1$, $b_2$, $b_3$, $b_4$ and $b_5$ respectively represent the state constants of polymer materials in the molten state.

Therefore, in order to solve the injection molding quality deviation caused by the melt viscosity change which results from the change in PVT characteristics, the invention provides a PVT weight control model based on the following to recalculate and obtain the optimized V/P switching point:

$$x_t = \frac{x_0 * V(T_f, P_f)}{V(T_0 P_0)}; \quad (3)$$

where $x_t$ is an optimized V/P switching point position at the current stage, and $x_0$ is an initial V/P switching point position; V(T,P) is a PVT relation function of currently processed materials, $T_0$ and $T_t$ are melt temperature in the pre-calculation stage and the self-adaptation stage respectively, and $P_0$ and $P_t$ are the pressure values of characteristic points on injection pressure curves of the pre-calculation stage and the self-adaptation stage respectively; and the characteristic point is a point on a collected injection pressure curve which is separated from the V/P switching point by a safe distance $X_s$ (ensure that the characteristic point is as close as possible to the V/P switching point, but will not affect the output and execution of the self-optimized V/P switching point).

The optimized V/P switching point is obtained through the PVT weight control model, compared with the traditional idea, the method combines the PVT characteristic relationship and melt index measurement mechanism of polymer materials to adjust the V/P switching point and holding pressure in the injection molding process; and compared with an existing V/P switching point and holding pressure control method, the method of the invention can respond to the fluctuation of melt viscosity in the injection molding process, and make adjustment and optimization responding to the fluctuation, so as to improve the repetition accuracy and yield of molded products.

After obtaining the optimized V/P switching point and holding pressure, in the self-adaption stage, the screw pushes the injection melt to the optimized V/P switching point, and then stops pushing, and the pressure holding stage starts at the same time, namely S71: introducing the residual melt into the mold cavity under the optimized holding pressure.

After completing the above steps, the injection molding task of this stage is completed. At this point, S4 is executed again to start the injection molding task of the next stage. Steps S4-S71 are repeated to continuously compare the injection molding work in the current stage with the first injection molding work, and obtain a new V/P switching point according to new PVT characteristics until all injection molding tasks are completed.

By continuously comparing the injection work and PVT characteristics between the current stage and the pre-calculation stage, and introducing the injection work adjustment model and PVT weight control model to obtain the optimized holding pressure and V/P switching point, the intelligent degree of an injection molding machine is greatly improved, the self-learning process can be completed within only one production stage, and the V/P switching point and holding pressure can be adjusted adaptively from the second stage, and the adjustment can be completed automatically in the whole process without manual intervention.

Meanwhile, the injection molding based on melt viscosity fluctuation is adaptively compensated by the method, and there is no need to install a sensor on a mold, which reduces the requirements for the mold itself and improves the adaptability and universality to a certain extent.

Embodiment 2

In order to better explain the invention, so that the technical points can be reflected more clearly, the dynamic adjustment of the invention is explained with a specific embodiment.

In this embodiment, polystyrene with different viscosities was used as processing raw materials, and standard warpage pieces were used as experimental products. Collection and preparation of parameters were also conducted, to ensure that the injection pressure and screw displacement of an injection molding machine can be acquired in real time, and the sampling period T was set to be 10 ms. Meanwhile, some preset process parameters were set as shown in Table 1.

TABLE 1

| Injection speed | V/P switching point | Holding pressure | Holding time | Barrel temperature | Mold temperature |
|---|---|---|---|---|---|
| 40 mm/s | 13 mm | 37 mpa | 15 s | 210° C. | 40° C. |

Before entering the self-adaption stage, the pre-calculation stage was conducted for one cycle, the pre-calculation parameters in the processing cycle were collected (in order to ensure the accuracy of injection work calculation, in the present embodiment, the processing cycle included 360 sampling cycles T), and a series of sampling points were obtained. The integral value of injection pressure versus screw displacement was calculated, and the corresponding injection work $W_0$ was obtained. Specific sampling points are shown in Table 2.

TABLE 2

| Sampling point | Injection pressure $p_i$/mpa | Screw displacement $x_i$/mm |
|---|---|---|
| 1 | 3.9633 | 80.999 |
| 2 | 4.0238 | 80.999 |
| 3 | 5.0222 | 80.9728 |
| ... | ... | ... |
| 356 | 41.5397 | 15.0219 |
| 357 | 42.0238 | 14.3800 |
| 358 | 42.9920 | 13.7288 |
| 359 | 42.3566 | 13.1328 |

Then the first injection work $W_0$ of the current cycle (i.e., the pre-calculation stage) was calculated based on the first calculation formula proposed by the invention, and the melt viscosity of the current cycle was characterized by this value:

$$W_0 = \left| K * \int_{X_{start}}^{X_{switch}} p\,dx \right| = \left| K * \sum \frac{p_i + p_{i-1}}{2}(x_i - x_{i-1}) \right|$$

where $X_{start}$ is 80.9999 mm, $P_{start}$ is 3.9633 mpa, $X_{switch}$ is 13.1328 mm and $P_{switch}$ is 42.3566 mpa. The injection work $W_0$ of the current cycle calculated by this formula was 141181.84 pa·mm.

After the screw reached the preset V/P switching point (i.e., upon entering the 359$^{th}$ sampling cycle), the screw stopped pushing the melt, the injection molding machine entered the pressure holding stage, and the residual melt was introduced into the mold cavity under the preset holding pressure to supplement the shrinkage of the product. The pre-calculation stage ended.

Then the injection molding machine was started to enter the self-adaption stage, the polystyrene raw material with reduced viscosity was added to continue processing, process curves including injection pressure and screw displacement were acquired in real time, and sampling operation was conducted with the sampling period of 10 ms on the injection pressure and screw curves. The corresponding real-time information obtained is shown in Table 3.

TABLE 3

| Sampling point | Injection pressure $p_i$/mpa | Screw displacement $x_i$/mm |
|---|---|---|
| 1 | 4.4474 | 81.0001 |
| 2 | 4.9315 | 80.9906 |
| 3 | 8.0780 | 80.7286 |
| ... | ... | ... |
| 356 | 36.8503 | 15.1506 |
| 357 | 37.3343 | 14.5090 |
| 358 | 38.0907 | 13.8604 |

Similarly, the second injection work $W_t$ was calculated by the second calculation formula of the invention, and the injection work $W_t$ of the current cycle (i.e., the self-adaption stage) can be expressed as:

$$W_t = \left| K * \int_{X_{start}}^{X^*_{switch}} p\,dx \right| = \left| K * \sum \frac{p_j + p_{j-1}}{2}(x_j - x_{j-1}) \right|$$

where $X_{start}$ is 81.0001 mm, $P_{start}$ is 4.4474 mpa, $X^*_{switch}$ is 13.8604 mm and $P^*_{switch}$ is 38.0907 mpa. The injection work of the current cycle calculated by this formula was 133950.4 pa·mm.

After calculating the injection work in the pre-calculation stage and the current stage, a key value of a PVT characteristic function of this kind of polystyrene in the PVT characteristic library was called, as shown in Table 4.

TABLE 4

| $b_1(m^3/kg)$ | $9.88 \times 10^{-4}$ |
|---|---|
| $b_2\left(\dfrac{m^3}{kg} \cdot °C.\right)$ | $6.10 \times 10^{-7}$ |
| $b_3(Pa)$ | $1.15 \times 10^8$ |
| $b_4(°C.^{-1})$ | $3.66 \times 10^{-3}$ |
| $b_5(°C.)$ | 112.0 |
| C | 0.0894 |

That is, the PVT characteristic function of the polystyrene is:

$$V[T, P] = [9.88 \times 10^{-4} + 6.10 \times 10^{-7}(T - 112.0)] \times \left\{1 - 0.0894\ln\left[1 + \frac{P}{1.15 \times 10^8 \exp[-3.66 \times 10^{-3}(T - 112.0)]}\right]\right\}$$

It can be seen from the above tables 2 and 3 that after entering the self-adaption stage, the injection pressure was reduced from 42.3566 mpa to 38.0907 mpa, and the barrel temperature was constant at 210° C., so according to the PVT key parameter table as shown in table 4, it can be calculated that the specific volume of the melt changed from $10.05 \times 10^{-4}$ m³/kg to $10.12 \times 10^{-4}$ m³/kg. Because the barrel temperature did not change, but the viscosity of the processed melt decreased, based on the PVT weight control model:

$$x_t = \frac{x_0 * V(T_t, P_t)}{V(T_0, P_0)}$$

where $x_0$ is 13 mm, $P_0$ is 42.0238 mpa, $P_t$ is 36.8503, so the optimized $x_t$ is 13.1 mm.

At the same time, by using the obtained change rate of injection work (i.e., viscosity) and the injection work adjustment model, the optimized holding pressure value in the current stage was output:

$$P_{KL} = P_{K0} * K_0 * \frac{W_t}{W_0}$$

Figure 2:
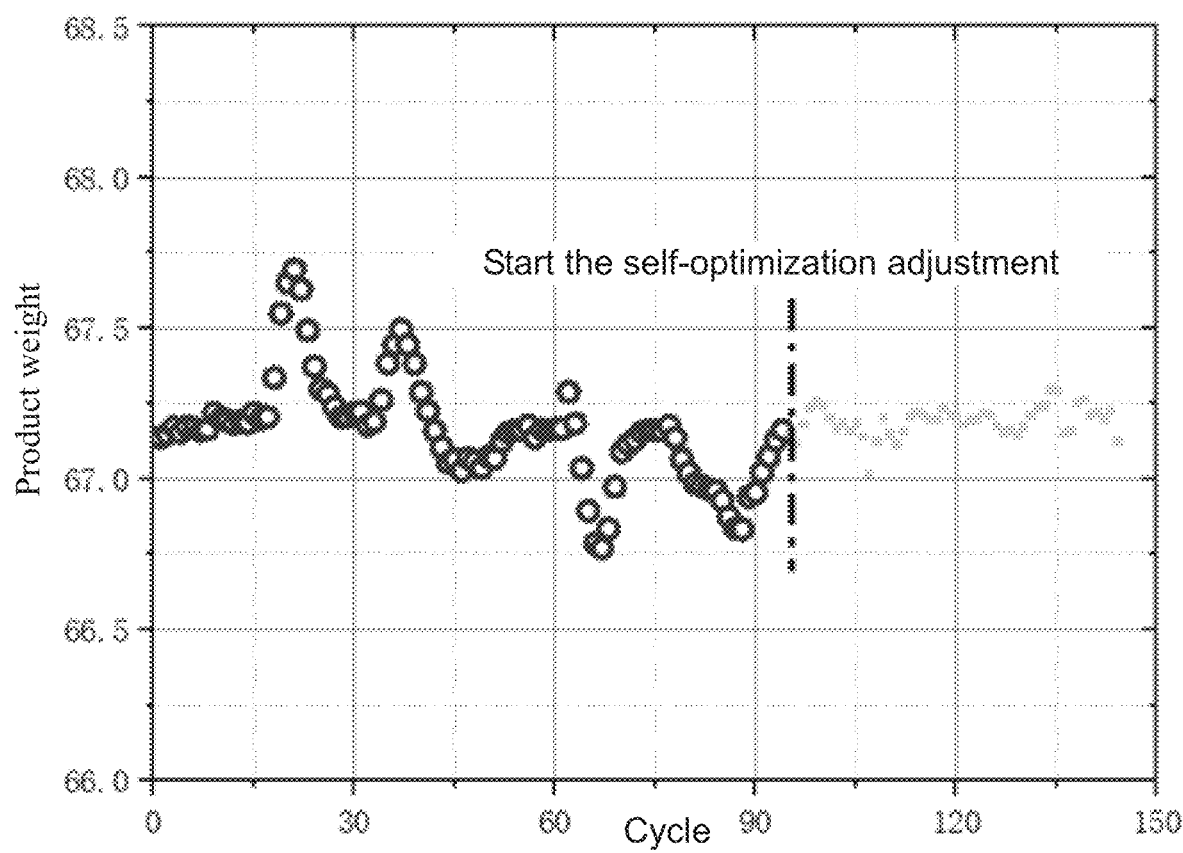
FIG. 2 is a comparison chart of weight fluctuation before and after adaptive adjustment.

By substituting $P_{K0}$, $W_0$ and $W_t$, the optimized holding pressure $P_{KL}$ is 35.10 mpa. Processing was continued step by step, the injection work and PVT characteristics of the current processing stage and the pre-calculation stage were calculated and compared in turn, formed experimental pieces were weighed, and the final results were plotted, so as to obtain a weight fluctuation comparison diagram before and after adaptive adjustment as shown in FIG. 2. From FIG. 2, it can be clearly seen that the fluctuation of product weight is obviously optimized after the self-optimization function is started.

To sum up, compared with the traditional idea, the injection molding adaptive compensation method based on melt viscosity fluctuation in the invention combines the PVT characteristic relationship and melt index measurement mechanism of polymer materials to adjust the V/P switching point and holding pressure in the injection molding process; and compared with an existing V/P switching point and holding pressure control method, the method of the invention can respond to the fluctuation of melt viscosity in the injection molding process, and make adjustment and optimization responding to the fluctuation, so as to improve the repetition accuracy and yield of molded products.

By means of the pre-calculation stage and the self-adaption stage, the intelligent degree of an injection molding machine is greatly improved, the self-learning process can be completed within only one production stage, and the V/P switching point and holding pressure can be adjusted adaptively from the second stage, and the adjustment can be completed automatically in the whole process without manual intervention. Besides, there is no need to install a sensor on a mold, which reduces the requirements for the mold itself and improves the adaptability and universality of the method to a certain extent.

The specific embodiments described herein are only illustrative of the spirit of the invention. Those skilled in the art to which the invention belongs can make various modifications or supplements to the specific embodiments described or replace them in a similar way, without departing from the spirit of the invention or exceeding the scope defined by the appended claims.

What is claimed is:

1. An injection molding adaptive compensation method based on melt viscosity fluctuation, characterized by comprising:
    S1, initializing equipment, and setting an initial V/P switching point, an initial holding pressure and an initial barrel temperature;
    S2, entering a pre-calculation stage, introducing melt into a mold cavity at a constant rate, and collecting pre-calculation parameters in each sampling period T, including injection pressure, screw displacement and melt temperature;
    S3, according to the pre-calculation parameters, obtaining a first injection work in the pre-calculation stage by using a first calculation formula;
    S4, entering a self-adaptation stage, introducing the melt into the mold cavity at a constant rate, and collecting adaptive parameters in each sampling period T, including injection pressure, screw displacement and melt temperature;
    S5, according to the adaptive parameters, obtaining a second injection work in the self-adaptation stage by using a second calculation formula;
    S6, calling the PVT characteristics of current processing raw materials to construct a PVT relation function, and obtaining an optimized V/P switching point by using a PVT weight control model; and
    S7, according to the injection work at the pre-calculation stage and the injection work at the present stage, obtaining an optimized holding pressure according to an injection work adjustment model;
    in S3, the first calculation formula is:

$$W_0 = \left| K * \int_{X_{start}}^{X_{switch}} p\,dx \right| = \left| K * \sum \frac{p_i + p_{i-1}}{2}(x_i - x_{i-1}) \right|; \quad (1)$$

where $W_0$ is the first injection work; a pressure value at a starting point of the pre-calculation stage is set to be $P_{start}$, and a screw displacement value is set to be $X_{start}$; a pressure at an end point of the pre-calculation stage is set to be $P_{switch}$, and a screw displacement value is set to be $X_{switch}$; and $p_i$ and $x_i$ respectively represent the injection pressure and screw displacement in an $i^{th}$ sampling period T, and K is a material correction coefficient related to the material itself;

in S5, the second calculation formula is:

$$W_t = \left| K * \int_{X_{start}}^{X^*_{switch}} p\,dx \right| = \left| K * \sum \frac{p_j + p_{j-1}}{2}(x_j - x_{j-1}) \right|; \quad (2)$$

where $W_t$ is the second injection work; a pressure value at a starting point of the self-adaptation stage is set to be $P_{start}$, a screw displacement value is set to be $X_{start}$, and the displacement value is consistent with $X_{start}$ in the pre-calculation stage; a pressure value at an end point of the self-adaptation stage is set to be $P^*_{switch}$, and a screw displacement value is set to be $X^*_{switch}$; and $p_j$ and $x_j$ respectively represent the injection pressure and screw displacement in a $j^{th}$ sampling period T, and K is a material correction coefficient related to the material itself;

in S6, the PVT weight control model is:

$$x_t = \frac{x_0 * V(T_t, P_t)}{V(T_0, P_0)};\qquad(3)$$

where $x_t$ is an optimized V/P switching point position at the current stage, and $x_0$ is an initial V/P switching point position; V(T,P) is a PVT relation function of currently processed materials, $T_0$ and $T_t$ are melt temperature in the pre-calculation stage and the self-adaptation stage respectively, and $P_0$ and $P_t$ are the pressure values of characteristic points on injection pressure curves of the pre-calculation stage and the self-adaptation stage respectively; and the characteristic point is a point on a collected injection pressure curve which is separated from the V/P switching point by a safe distance $X_s$;

$$V(T,P) = [b_1 + b_2(T-b_5)]\left\{1 - C\ln\left[1 + \frac{P}{b_3 \exp[-b_4(T-b_5)]}\right]\right\};\qquad(5)$$

where V(T,P) is the specific volume under temperature T and pressure P, C is a universal constant, and $b_1$, $b_2$, $b_3$, $b_4$, and $b_5$ respectively represent the state constants of polymer materials in the molten state;

in S7, the injection work adjustment model is:

$$P_{KL} = P_{K0} * K_0 * \frac{W_t}{W_0};\qquad(4)$$

where $P_{KL}$ is an optimized holding pressure value of each mold, $P_{K0}$ is an initial holding pressure, and $K_0$ is a correction coefficient related to a material product.

2. The injection molding adaptive compensation method based on melt viscosity fluctuation according to claim 1, characterized in that before S1, S0 is also included: establishing a PVT characteristic library according to raw material types.

3. The injection molding adaptive compensation method based on melt viscosity fluctuation according to claim 1, characterized in that in S2, pre-calculated parameters of a preset number of sampling periods T are collected.

4. The injection molding adaptive compensation method based on melt viscosity fluctuation according to claim 1, characterized in that the sampling periods T of the pre-calculation stage and the self-adaptation stage are consistent.

5. The injection molding adaptive compensation method based on melt viscosity fluctuation according to claim 1, characterized in that after S3, S31 is also included: entering a pressure holding stage, and introducing residual melt into the mold cavity under the initial holding pressure.

6. The injection molding adaptive compensation method based on melt viscosity fluctuation according to claim 1, characterized in that after S7, the method further comprises:

S71, entering a pressure holding stage, and introducing residual melt into the mold cavity under the optimized holding pressure; and S8: returning to S4 until the injection molding task is completed.

* * * * *